June 11, 1946. R. P. SCHOLFIELD Re. 22,765

FILING APPARATUS

Original Filed Aug. 26, 1942 2 Sheets-Sheet 1

Inventor:

Richard P. Scholfield,

By Lee Smith Darby, Lee Smith

Attorneys.

June 11, 1946. R. P. SCHOLFIELD Re. 22,765

FILING APPARATUS

Original Filed Aug. 26, 1942 2 Sheets-Sheet 2

Inventor

Richard P. Scholfield,

By Cushman Darby & Cushman.

Attorneys

Reissued June 11, 1946

Re. 22,765

UNITED STATES PATENT OFFICE 22,765

FILING APPARATUS

Richard P. Scholfield, New York, N. Y., assignor to Scholfield Service, Inc., New York, N. Y., a corporation of New York Original No. 2,368,162, dated January 30, 1945, Serial No. 456,253, August 26, 1942. Application for reissue July 2, 1945, Serial No. 602,756

14 Claims. (Cl. 129—16)

The present invention relates to filing apparatus of the type wherein a plurality of cards are secured upon the periphery of a rotatable filing drum, to facilitate access to a great plurality of cards by an operator. The invention includes modifications of, improvements upon and additions to filing apparatus of the types shown in the prior patent to Scholfield et al. No. 2,046,655, July 7, 1936, and in my application Serial No. 75,883, filed April 22, 1936, now Patent 2,231,029, February 11, 1941.

An object of the present invention is to provide improved card retaining rail structures, adapted to perform certain new and improved functions.

A further object of the invention is to provide card retaining means which makes it possible to secure certain of the cards upon the drum in offset or staggered relation to other cards, so that the former are positioned in a conspicuous manner for ready access by an operator.

A further object of the invention is to provide improved card retaining rail shapes and cards having novel slots therein adapted to cooperate with the rails, to secure the cards thereon in an improved manner.

A number of preferred embodiments of the invention are shown in the accompanying drawings, but it must be understood that the invention is not limited to the specific details of construction shown herein and described below, as many modifications will readily occur to one skilled in the art, from a consideration of the disclosure of this specification.

This application is a continuation-in-part of my application, Serial No. 386,326, filed April 1, 1941, since matured into Patent No. 2,316,489, April 13, 1943.

As disclosed in the aforesaid patents and in my Patents No. 2,332,605, No. 2,332,606 and No. 2,316,489, filing drums of the type with which the present invention is concerned comprise a pair of drum heads which may be formed of stamped or spun metal and a cylindrical rim 100 preferably constructed of cast aluminum, suitably machined and having its marginal flanges 101, 102 secured upon shoulder portions of the drum heads by tie-bolts which draw the heads together and firmly clamp the rim in place. Since the invention of the present application is not concerned with the drum structure, only the rim and associated parts are shown in the accompanying drawings. The drum as a whole is mounted for rotation about a horizontal, inclined, or vertical axis, in a well known manner.

Figure 1:
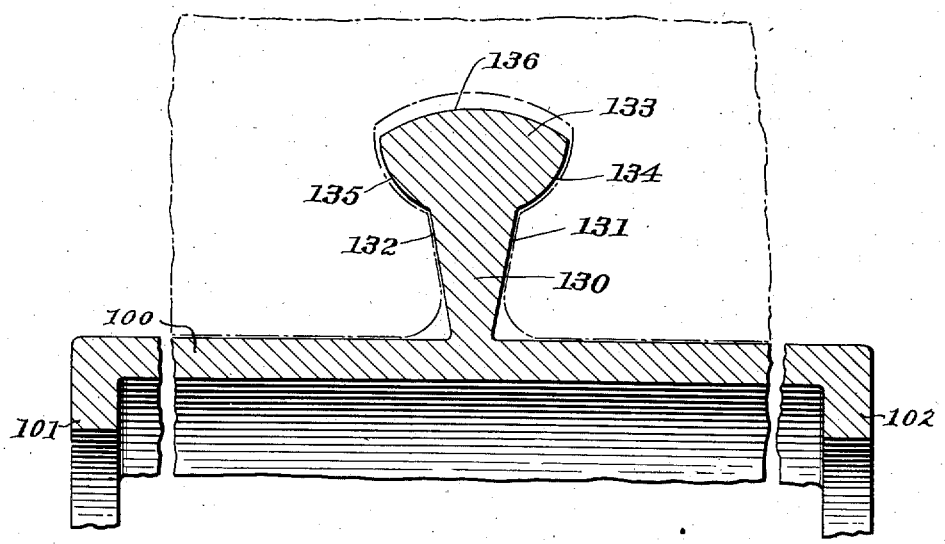
Figure 1 is a transverse section through the rim of a filing drum in accordance with the present invention, showing one form of card retaining rail.
Figure 2:
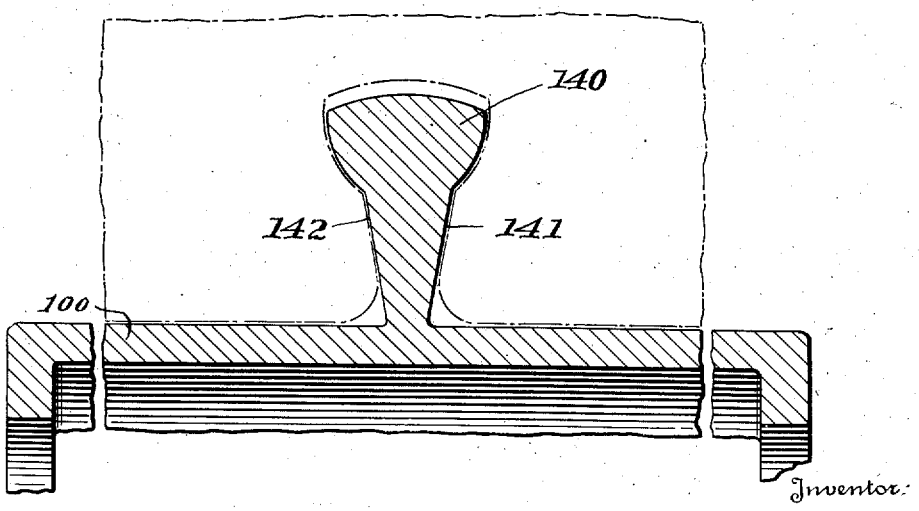
Figure 2 is a similar view showing another form of rail.

As shown in Figures 1 and 2, the rim 100 is provided with one or more radially projecting rails, each of which may be continuous entirely around the drum periphery or interrupted and provided with removable sections, as described in my Patent No. 2,316,489. The rail comprises a web 130 having side faces 131, 132 which diverge in an outward direction from the periphery of the drum to the head 133, to produce a wedge effect upon the margins of the slotted throat of the card, indicated in dotted lines. At the outer end of the diverging portion of the rail web, the head 133 is positioned, defined by arcuate side faces 134, 135 and an upper of outer arcuate surface 136. As shown, the side faces 134 and 135 are struck about spaced centers on arcs of equal radius. The outer surface 136 is disposed on a flatter arc, struck about a different center on a longer radius. This construction provides a line contact with the cards of increased length, and the head positively prevents the cards from riding outwardly and becoming tightly wedged to the rail web. The elongated, relatively flat arc 136 at the outer end of the rail head provides an elongated bearing surface for the cards, when the cards are tipped rearwardly or forwardly for inspection or the like. Moreover, the elongated bearing surface maintains the cards in alignment and facilitates finding the cards.

In Figure 2, a slightly different form of rail is shown, in that the head 140 at the outer end of the outwardly diverging side walls 141, 142 is laterally enlarged to a lesser degree than in the form shown in Figure 1. However, it will be noted that the side faces are again formed on arcs of equal radius and that the outer surface is disposed on a flatter arc on a longer radius. The rail of Figure 2 illustrates a typical change in the proportion of parts contemplated by the invention and shows that the principle of the invention may be employed in a plurality of different designs.

Figure 3:
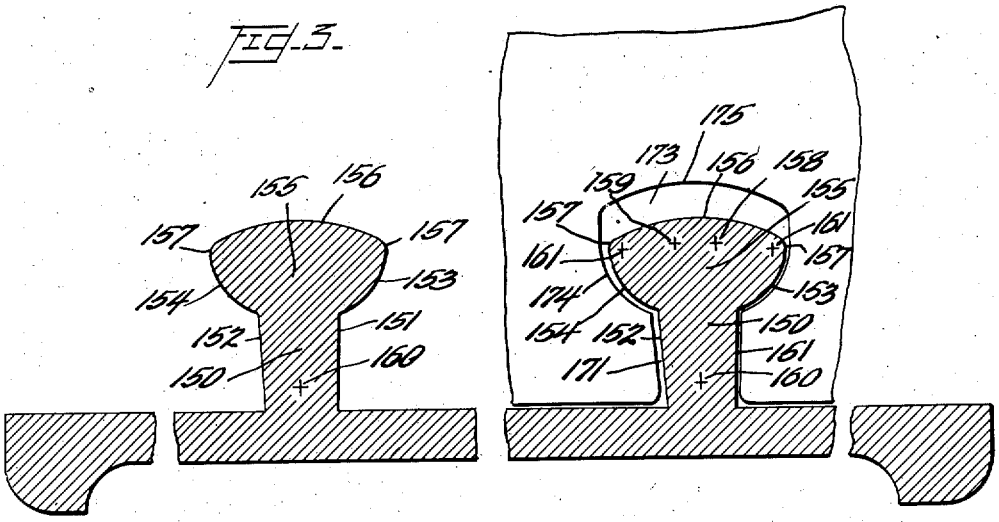
Figure 3 is a similar view of still another form of rail.

Similarly, the rail and slotted card arrangement of Figure 3 illustrates a further minor variation. In this case the web 150 is relatively thicker than the web in the first two forms of the invention, and the side walls 151, 152 diverge on a smaller angle. Further, the side faces 153, 154 of the head 155 join the outer end face 156 on arcuate curves 157 of short radius, instead of intersecting the outer surfaces as in Figures 1 and 2. Surfaces 153 and 154 are disposed, in section, on arcs struck about centers 158, 159 respectively, while the outer surface 156 is struck about a center 160. Hence, the radii of the arcs 153 and 154 are equal, while the radius of the arc 156 is considerably longer. The corner arcs 157, which merge tangentially with the inner and outer rail head surface are struck about centers 161, on short radii.

The slot cut adjacent the inner edge of the card includes a throat 171 having margins parallel to the side faces 151, 152 of the web 150, and an inner enlargement 173 having side margins 174, the lower portions of which are concentric to the side faces 153, 154 of the rail head. The upper margin 175 is spaced outwardly a substantial distance from the outer surface 156 of the rail head, to permit the card to be tipped rearwardly or forwardly, and is cut on an arc having a radius equal in length to the radius of the arc of surface 156.

Thus, when the cards are standing radially on the drum, they are retained by a line contact with the rail of substantial length, and when they are tipped forwardly or rearwardly, they engage the outer face of the rail head over a substantial area.

As a result of the combination of the diverging side walls of the web and the laterally enlarged head at the outer end thereof the holding power of the rail on the cards is increased and the rail as a whole may be of lesser height or radial dimension than in other cases.

Figure 4:
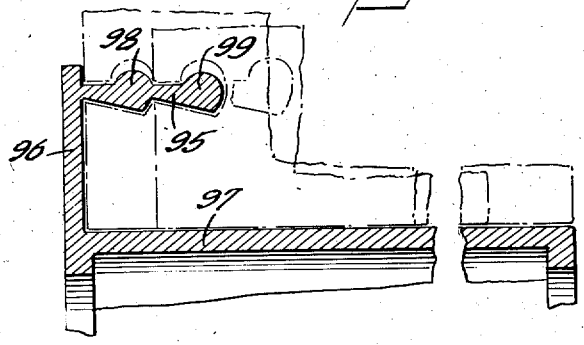
Figure 4 is a view of another modification in which the cards may be mounted in staggered or offset relation.

In Figure 4 there is shown a modified form of drum and card retaining rail adapted to secure a plurality of cards upon the periphery of the drum in axially staggered relation. In this case, the card retaining rail 95 projects axially from a drum head 96, which may be integral with the rim 97 or formed separately. Thus, the rail 95 is disposed in concentric spaced relation to the rim. The rail has two or more enlargements 98, 99, the upper surfaces of which may be arcuate, and the lower or radially inner surfaces inclined and diverging from the outer surfaces, as previously explained. Cards having similarly shaped slots may be secured thereon in staggered relation as indicated in Figure 4. This type of card retaining means is particularly useful in cases where the drum is mounted for rotation on a substantially vertical or inclined axis. It provides means for firmly securing the cards to the drum and for offsetting certain of the cards, axially relative to the others.

Although the invention has been described with considerable particularity by reference to the embodiments shown in the accompanying drawings, it must be understood that it is not limited to the details of construction shown therein and described above, but includes all modifications coming within the scope of the appended claims and their equivalents.

I claim:

1. A rotary filing drum comprising a substantially cylindrical surface and a card retaining rail associated therewith, said rail having side faces diverging outwardly in cross section from the surface and providing a rail web of constantly increasing thickness from the surface outwardly and adapted to engage the margins of a wedge-shaped opening in a card, and a laterally enlarged head at the outer edge of the web portion having side faces which are arcuate in cross section and which are adapted to engage correspondingly shaped margins of an enlarged portion of said opening in the card.

2. A rotary filing drum comprising a substantially cylindrical rim having a card retaining rail projecting outwardly therefrom and arranged circumferentially of the rim, said rail having a web portion defined by side faces diverging outwardly in cross section from the rim, and a laterally enlarged head having convex side and top faces disposed in cross section, on arcuate curves struck about spaced centers.

3. A rail for retaining cards upon the periphery of a filing drum, comprising a web having diverging side faces adapted to be positioned in a wedge-shaped throat of a slot in a card, and a laterally enlarged head adjacent the end of the web, adapted to be positioned in an enlargement at the inner end of the throat in the slot in the card.

4. A filing drum comprising a cylindrical surface, a head at one end thereof projecting radially outwardly therebeyond, and a peripheral card retaining rail projecting axially from the head and having an enlargement thereon adapted to secure a plurality of cards upon the periphery of the drum.

5. A filing drum comprising a cylindrical surface, a head at one end thereof projecting radially outwardly therebeyond, and a substantially cylindrical card retaining rail projecting axially from the head in concentric relation to said cylindrical surface, said rail having an enlargement adapted to be received in reentrant slots in a plurality of cards to retain the same upon the drum.

6. A filing drum comprising a cylindrical surface, a head at one end thereof projecting radially outwardly therebeyond, and a substantially cylindrical card retaining rail projecting axially from the head in concentric relation to said cylindrical surface, said rail having a plurality of axially spaced enlargements thereon, whereby cards having slots with a similar plurality of enlargements may be secured on said drum in axially staggered relation.

7. In combination, a rotary filing drum and a set of filing cards secured upon the drum, said drum comprising a substantially cylindrical surface and a card retaining rail associated therewith, said rail having side faces diverging outwardly in cross section from the surface and providing a rail web of constantly increasing thickness from the surface outwardly and a laterally enlarged head at the outer edge of the web portion, having side faces which are arcuate in cross section, each of said cards having a slot adjacent its inner edge having margins defining a wedge-shaped throat engaging the rail web and an enlarged portion at the end of the throat having arcuate side margins complemental in shape to and engaging the side faces of the rail head.

8. In combination, a rotary filing drum and a set of cards secured upon the periphery thereof, said drum comprising a substantially cylindrical rim having a card retaining rail projecting outwardly therefrom and arranged circumferentially thereof, said rail having a web portion defined by side faces diverging outwardly in cross section from the rim, and a laterally enlarged head having convex side and top faces disposed, in cross section, on arcuate curves struck about spaced centers, the cards of said set each having a slot adjacent its inner edge having a throat defined by diverging margins engageable with the side faces of the web portion of the rail and a laterally enlarged opening having concave side and top margins disposed on arcuate curves of the same radii as the adjacent curves of the rail head and also struck about spaced centers.

9. In combination, a rail for retaining cards upon the periphery of a filing drum, and a set of cards retained thereon by the rail, each of said cards having a slot adjacent one edge thereof, comprising a wedge-shaped throat and a lateral enlargement at the inner edge of the throat, said rail comprising a web having diverging side faces positioned in and snugly fitting the wedge-shaped throats in the cards and a laterally enlarged head adjacent the end of the web, positioned in the enlargements in the cards.

10. For use with a rotary filing drum having a card retaining rail comprising a web and a head of non-circular cross-section of minimum width adjacent the web and of maximum width adjacent its top surface, said head, in cross-section, having arcuate side margins of equal curvature and an arcuate top margin of flatter curvature disposed on a longer radius; a card having a rail engaging a slot adjacent its lower edge having margins forming a relatively narrow throat adapted to embrace said web and a laterally and upwardly enlarged, non-circular opening of minimum width adjacent the throat and of maximum width adjacent the top and adapted to embrace the head of said rail, the side margins of the opening having curvatures equal to the sides of the rail head and being connected by a top margin of flatter curvature on the same radius as the top of the rail head.

11. For use with a rotary filing drum having a card retaining rail comprising a web and a head of non-circular cross-section of minimum width adjacent the web and of maximum width adjacent its top surface, said head, in cross-section having arcuate side margins of equal curvature and an arcuate top margin of flatter curvature disposed on a longer radius; a card having a rail engaging slot adjacent its lower edge having margins forming a relatively narrow throat adapted to embrace said web and a laterally and upwardly enlarged, non-circular opening of minimum width adjacent the throat and maximum width adjacent the top and adapted to embrace the head of said rail, said opening being defined by opposite side margins of equal curvature, more sharply curved adjacent the throat, and each equal in radius at that portion to the radius of the adjacent side margin of the rail, and less curved adjacent the top of the opening, the top margin of the opening being disposed on an arcuate curve of a radius equal to that of the top of the rail head.

12. For use with a rotary filing drum having a card retaining rail comprising side faces diverging outwardly in cross-section from the drum and providing a rail web of constantly increasing thickness and a laterally enlarged head of non-circular cross-section of minimum width adjacent the web and of maximum width adjacent its top surface; a card having a rail engaging slot adjacent its lower edge having margins forming a relatively narrow upwardly diverging, wedge-shaped throat adapted to embrace the rail web, and a laterally and upwardly enlarged non-circular opening of minimum width adjacent the throat and of maximum width adjacent the top and adapted to embrace the head of the rail, the opening having arcuate side and top margins complemental in shape to and adapted to engage the side and top surfaces of the rail head.

13. For use with a rotary filing drum having a card retaining rail comprising a straight sided, outwardly diverging web and a head of non-circular cross-section of minimum width adjacent the web and of maximum width adjacent its top surface and having, in cross-section, arcuate side margins of equal radius struck about spaced centers, and an arcuate top margin of longer radius struck about a different center; a card having a rail engaging slot adjacent its lower edge having margins forming a wedge-shaped throat adapted to embrace and engage said web and a laterally and upwardly enlarged non-circular opening of minimum width adjacent the throat and of maximum width adjacent the top and adapted to embrace and engage the head of the rail, the side margins of the opening, at least in part, being disposed on arcuate curves of radii equal to the radii of the curves of the sides of the rail head and struck about similarly spaced centers, the side margins of the opening being connected by an arcuate top margin of a radius equal to the radius of the curve of the top of the rail head.

14. For use with a rotary filing drum having a plurality of parallel card retaining rails, each shaped to provide an outwardly diverging straight sided web and a head of non-circular cross-section of minimum width adjacent the web and of maximum width adjacent the top surface thereof and having, in cross-section, arcuate side margins of equal radius and an arcuate top margin of longer radius; a card having a plurality of spaced rail engaging slots adjacent its lower edge, each having margins forming a wedge-shaped throat adapted to embrace and engage one of said webs and a laterally and upwardly enlarged non-circular opening of minimum width adjacent the throat and of maximum width adjacent the top and adapted to embrace the head of one of said rails, the side margins of each of the openings each having an arcuate curvature equal in radius, at least in part, to the adjacent side of the rail head and an arcuate top margin equal in radius to the top of the rail head.

R. P. SCHOLFIELD.